Figures 1, 2, 3, 4, 5, 6:
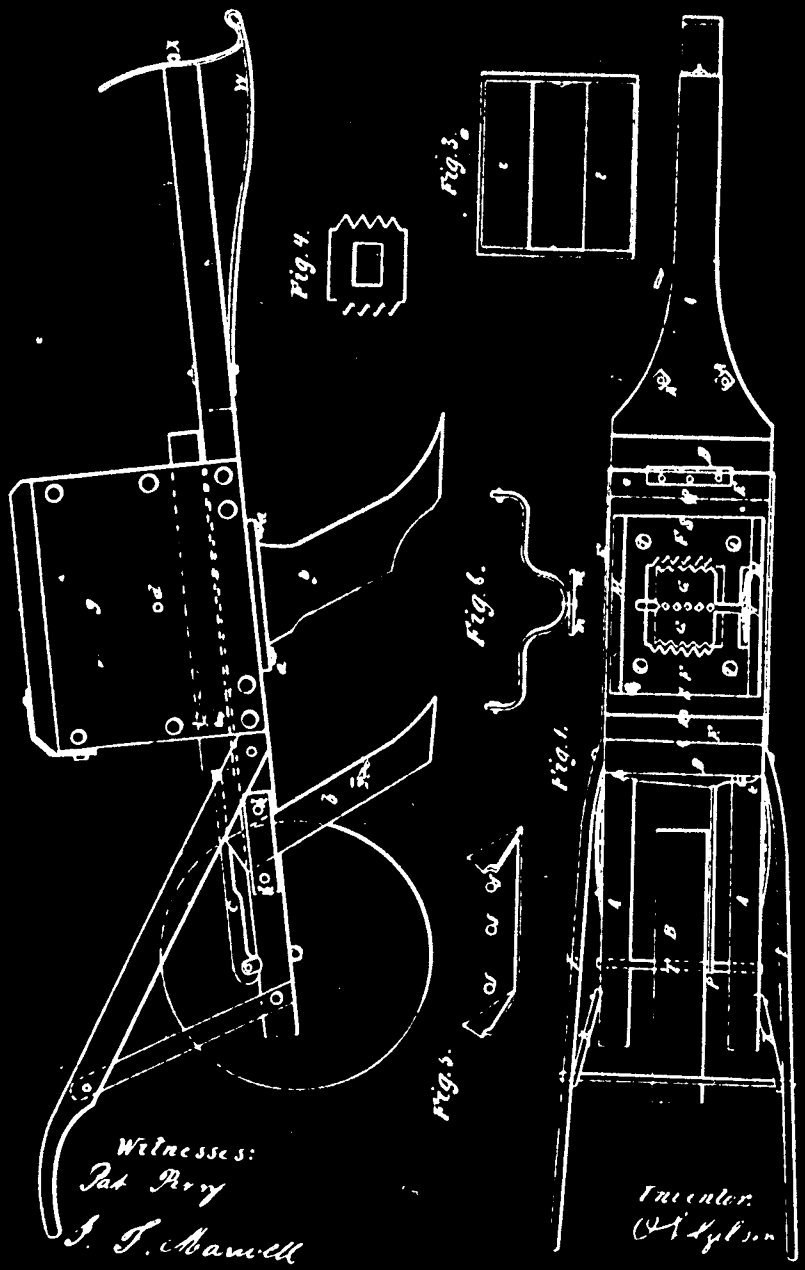

BEST AVAILABLE COPY

111. PLANTING.
71

O. L. Gibson.

Seed Planter.

No. 29,964.

Patented Sep. 11, 1860.

Witnesses:
Pat Perry
J. T. Maxwell

Inventor:
O L Gibson

BEST AVAILABLE COPY

UNITED STATES PATENT OFFICE.

OLIVER L. GIBSON, OF FORT BEND COUNTY, TEXAS.

IMPROVEMENT IN COTTON-SEED PLANTERS.

Specification forming part of Letters Patent No. 29,961, dated September 11, 1860.

*To all whom it may concern:*

Be it known that I, O. L. GIBSON, in the county of Fort Bend and State of Texas, have invented certain new and useful Improvements in Seed-Planters; and I do hereby declare the following to be a full, clear, and exact description of the same, reference being had to the accompanying drawings, and to the letters of reference marked thereon.

My invention consists in a machine for planting seed, with the entire bottom of the box which contains the seed movable for the purpose of conveying the seed in the box to that part of the box from which they are to be dropped, and partly changeable for the purpose of making it apply to the kind and quantity of seed desired to be planted in a given place or space.

In order to enable others skilled in the art to make and use my invention, I will proceed to describe its construction and operation.

On reference to the drawings which form a part of this specification, Figure 1 is a plan of my improved seed-planter. Fig. 2 is an elevation of the same. Fig. 3 is a plate with beveled sides; Fig. 4, a plate; Fig. 5, a plate; Fig. 6, a gage.

A is the main beam. D is a movable bottom of the seed-box; F, a mortise through the same; B, seed-box; G, a flanged roller for planting cotton-seed; H, a small cog-wheel on the gudgeon of the flanged roller. B is a driving-wheel. T is a gudgeon passed through the center of the driving-wheel. This gudgeon is furnished with a crank and piston-rod at P. The piston-rod is attached to the movable bottom of the seed-box at *c c*. L L are handles; K K, uprights to support the handles.

Fig. 2, *g*, seed-box; *y*, opener for the seed. O is a coverer; *h h*, fastenings for the same. *w* is a regulator to regulate the depth of the opener.

The main beam should be cut from a solid piece of timber, with a mortise through it centrally under the place you design to have your seed-box. This mortise should be large enough for the operation of any flanged roller you wish to place in it. Another mortise should be cut for the cog-wheel. The movable bottom of the seed-box may be framed or cut from a solid piece of timber, beveling the sides of the mortise, as represented at *m m*. The seed-box should be so constructed that an open space shall be left at the bottom in front and rear for the operation of the movable bottom. The roller for the fangs should be made of durable wood, the fangs of wrought iron. If you design to plant in hills or bunches, the fangs should be fastened to the roller in sets across the roller at a distance from each other ascertained by a calculation made by comparing the size or circumference of the driving-wheel with the stroke of the piston. The circumference of the cog-wheel and the fanged roller, if it is designed to drill the fangs, should be fastened in sets diagonally across the roller or around the roller. The roller should be larger around than the cog-wheel. This roller is detachable, and any number of them desired may go with the same machine. The opener should be of cast-iron, hollow, a flange at top, and fastened to the main beam with four bolts, as represented at I I I I, Fig. 1, screws and taps, as represented at *a a*, Fig. 2. The coverers should be of wrought iron or steel. The regulator should be so constructed that it can be easily raised or lowered by a thumb-screw, as represented at *x*. The beveled plate, Fig. 3, is made to fit the mortise in the movable bottom of the seed-box. It has a set of cogs on the under side that match with the cogs on the cog-wheel of the fanged roller. It has an opening through the bottom the width of the fanged roller. It is fastened in the mortise of the movable bottom with thumb-screws at S S. Fig. 4 should be of cast-iron, with a hole in the center large enough for corn-seed, bean-seed, &c., to pass through with ease. This plate should fit the orifice *y y* when the fanged roller is taken out.

Fig. 5 is a cast-iron plate used for planting corn, beans, peas, &c. The size of the holes represented at *f* should be made with a view to the kind and quantity of seed designed to be dropped at one place. The number of times you wish to drop seed during one revolution of the driving-wheel is regulated by the number of holes in this plate. A hole in one end will drop once, and a hole in the center will drop twice during one revolution of the driving-wheel. If it is designed to keep a continuous dropping of seed, these holes should cut into each other, leaving mere notches on the sides of a continuous opening. This plate should fit the opening in the bottom of the beveled plate, Fig. 3,

BEST AVAILABLE COPY and fasten with the same screws. This piece is detachable, and any number of them [illegible] may go with the same machine [illegible]

Fig. 6 is a gage used for preventing [illegible] seed from passing down through the [illegible] Fig. 6 than is designed should pass [illegible] bottom of this gage should [illegible] with the hole in Fig. 1. It fastens with screws [illegible] side of the seed-box at the ends [illegible]

Operation.—For planting [illegible] flanged roller is in its place, the [illegible] is placed and fastened, the cotton-seed [illegible] in the box, the team is hitched to the [illegible] for at the end of the beam, the team moves forward, the driving-wheel turns, the [illegible] acts on the movable bottom of the seed-box, and the movable bottom acts on the [illegible] giving the flanged roller a rotary [illegible] and aft. The fangs are fed by the [illegible] of the movable bottom. The [illegible] seed down through the [illegible] beam and drop them through the hollow [illegible] er into the furrow below and is covered by the coverers. The driving-wheel presses the [illegible] down on the seed. For planting [illegible]

[illegible]

Witnesses:

[illegible]